US006963533B2

(12) United States Patent
Kukic

(10) Patent No.: US 6,963,533 B2
(45) Date of Patent: Nov. 8, 2005

(54) METHOD AND SYSTEM FOR ESTABLISHING LINK BIT RATE FOR INVERSE MULTIPLEXED DATA STREAMS

(75) Inventor: Brana Kukic, Santa Rosa, CA (US)

(73) Assignee: Nokia Inc., Irving, TX (US)

(*) Notice: Subject to any disclaimer, the term of this patent is extended or adjusted under 35 U.S.C. 154(b) by 832 days.

(21) Appl. No.: 09/751,581

(22) Filed: Dec. 29, 2000

(65) Prior Publication Data

US 2003/0169780 A1 Sep. 11, 2003

(51) Int. Cl.[7] ................................................ H04J 1/16
(52) U.S. Cl. ..................... 370/228; 370/535; 370/536; 370/537
(58) Field of Search .................... 370/225, 228, 370/535–537, 248, 252, 253, 351, 468

(56) References Cited

U.S. PATENT DOCUMENTS

| 5,155,483 | A | * | 10/1992 | Morimoto | 370/228 |
|---|---|---|---|---|---|
| 5,459,720 | A | * | 10/1995 | Iliev et al. | 370/393 |
| 5,526,350 | A | * | 6/1996 | Gittins et al. | 370/477 |
| 6,002,670 | A | * | 12/1999 | Rahman et al. | 370/238 |
| 6,438,141 | B1 | * | 8/2002 | Hanko et al. | 370/477 |
| 6,574,191 | B1 | * | 6/2003 | Usukura et al. | 370/216 |
| 6,577,653 | B1 | * | 6/2003 | Rochberger et al. | 370/536 |
| 6,580,688 | B1 | * | 6/2003 | Klink | 370/220 |
| 6,711,137 | B1 | * | 3/2004 | Klassen et al. | 370/252 |
| 6,813,241 | B1 | * | 11/2004 | Wang et al. | 370/228 |
| 2001/0040919 | A1 | * | 11/2001 | An | 375/225 |

OTHER PUBLICATIONS

The ATM Forum Technical Committee "Inverse Multiplexing for ATM (IMA) Specification, Version 1.0", AF–PHY–0086.000, Jul. 1997.

* cited by examiner

*Primary Examiner*—Ricky Ngo
*Assistant Examiner*—Nittaya Juntima
(74) *Attorney, Agent, or Firm*—Darby & Darby PC

(57) ABSTRACT

A system and method are provided for determining link characteristics in order to calculate the optimal data rate because of a link failure. The system includes a first unit (20, 22) at a first location coupled to one end of each of a plurality of low capacity data links (28) for assisting in determining the characteristics of each of the links (28), a second unit (22, 20) at the second location coupled to the other end of each of the links (28) for assisting in determining the characteristics of each of the links (28) based on the characteristics of the test signal received at the second unit (22, 20), and a processor coupled to the second unit (22, 20) for determining the optimal transmission rate based on the characteristics of the links (28) and the number of links (28) needed to provide the desired transmission rate.

18 Claims, 2 Drawing Sheets

METHOD AND SYSTEM FOR ESTABLISHING LINK BIT RATE FOR INVERSE MULTIPLEXED DATA STREAMS

BACKGROUND

This invention relates to telecommunication systems, and more specifically, to inverse multiplexing data streams over multiple links.

In telecommunication networks or systems, data or a data stream is transported from one location in the network to another location in the network at various data rates. Thus, the situation may arise, at some point in the network, where the transport data rate for an incoming data stream exceeds the capacity of a single link over which the data stream needs to be transported. Known solutions to this problem teach that the data stream can be distributed or split into separate streams and the separate streams sent over multiple links or lines of lower capacity; the aggregate capacity of the lower capacity links is sufficient to carry the data stream This approach to splitting data or transporting the data stream over several links is known as "inverse multiplexing".

Even when a high capacity link is available in the network that can handle the entire incoming data stream, the data stream may not make full use of the capacity of the single link. Thus, current standards teach that it may be preferable to inverse multiplex the data stream onto a number of lower capacity links, and thereby fully utilize the capacity of the links in the network.

In a typical network, there are various bandwidths described in terms of data stream rates or bit rates. For example, a DS1 or T1 bit stream is transmitted at a line rate of 1.544 Mbps. The terms "DS1" and "T1" are used interchangeably herein. T1 is a full-duplex system: transmitted signals are transported on one wire pair, and received signals are transported on a separate wire pair. In each direction, the 1.544 Mbps data streams are organized according to a predetermined protocol. An alternative data rate is E1. E1 bit streams are transmitted at a line rate of 2.048 Mbps.

In order to transport data from one location to another, the data is packaged according to a predetermined protocol. One protocol is Asynchronous Transfer Mode (ATM). In accordance with ATM standards, the data is packaged in cells that are called ATM cells. Each ATM cell is 53 bytes in length, wherein each byte is an octet that is made up of eight bits. Each ATM cell includes a payload or information that is 48 octets in length and a header that is 5 octets in length. The header includes information about the payload type (PT) as well as other information. There are various forms of payload, including idle payload. Idle ATM cells may be present in an ATM data stream and may be inserted or deleted by the equipment processing the ATM data stream. ATM equipment that communicates at rates exceeding the capacity of a T1 line can communicated over multiple T1 lines, which have an aggregate capacity comparable to the rate of the ATM equipment, using an inverse multiplexing scheme.

In the inverse multiplexing scheme, the ATM data stream is divided over several low capacity lines, such as the T1 lines. For example, ATM Forum specification "Inverse Multiplexing for ATM (IMA) Specification Version 1.0", AF-PHY-0086.000 (July 1997) defines one approach to inverse multiplexing ATM cell streams on multiple T1 lines, which is incorporated herein by reference.

Depending on the transmission rate or bandwidth demand of the ATM data stream, the ATM data stream will have to be divided over several lower capacity lines. For example, if the data stream is received at a rate that is four times an optimal data rate of the lower capacity lines, then the incoming ATM data stream will have to be inverse multiplexed onto or carried by at least four lines.

Known methods of inverse multiplexing teach that all of the low capacity links, among which the ATM data stream is inverse multiplexed, have to be trained at an optimal rate and synchronized so that each line is transmitting from the transmitter end to the receiver end at the same rate. Once the optimal rate is determined and selected, which is based on the number of links needed and the rate or bandwidth of each link, then all of the links operate at that optimal rate until one of the links fails and the optimal rate has to be recalculated.

The disadvantage of current solutions, and thus, the problem with the known methods for determining the optimal rate is that the links are considered and trained as needed. This leads to unnecessary time delays for restoring traffic flow when a link failure occurs because the characteristics of other links have to be determined and a new optimal rate established. Thus, at a data rate of 8 Mbps for an ATM cell stream, every minute that there is a delay in restoring traffic flow 480 Mb of traffic stack up or are lost.

Therefore, what is needed is a system and method for determining as many links characteristics as possible in order to calculate a new optimal rate, and hence, eliminate the down time caused by a failure in a link.

SUMMARY

A system and method are provided for determining link characteristics in order to calculate the optimal data rate. The system includes a first unit at a first location coupled to one end of each of a plurality of low capacity data links for assisting in determining the characteristics of each of the links using a test signal transmitted over each of the links, a second unit at the second location coupled to the other end of each of the links for assisting in determining the characteristics of each of the links based on the characteristics of the test signal received at the second unit, and a processor coupled to the second unit for determining the optimal transmission rate based on the characteristics of the links and the number of links needed to provide the desired transmission rate.

The method includes determining the characteristics and a maximum rate for each of the links to create a list of available links and associated transmission rates; selecting the link with the lowest rate and setting all available links to transmit at the same rate to determine a total available rate; comparing the total available rate based on the lowest rate and the number of available links to the desired rate; selecting the next lowest rate from the available rates and setting all other links to transmit at the next lowest rate to determine another total available rate; continuing the selecting and comparing until all available rates have been considered to create a list of maximum rates that correspond to the rate for one of the available links, and thus, selecting one total available rate from the total available rates that is at least equal to or greater than the desired rate to produce the optimal rate.

DETAILED DESCRIPTION

Figure 1:
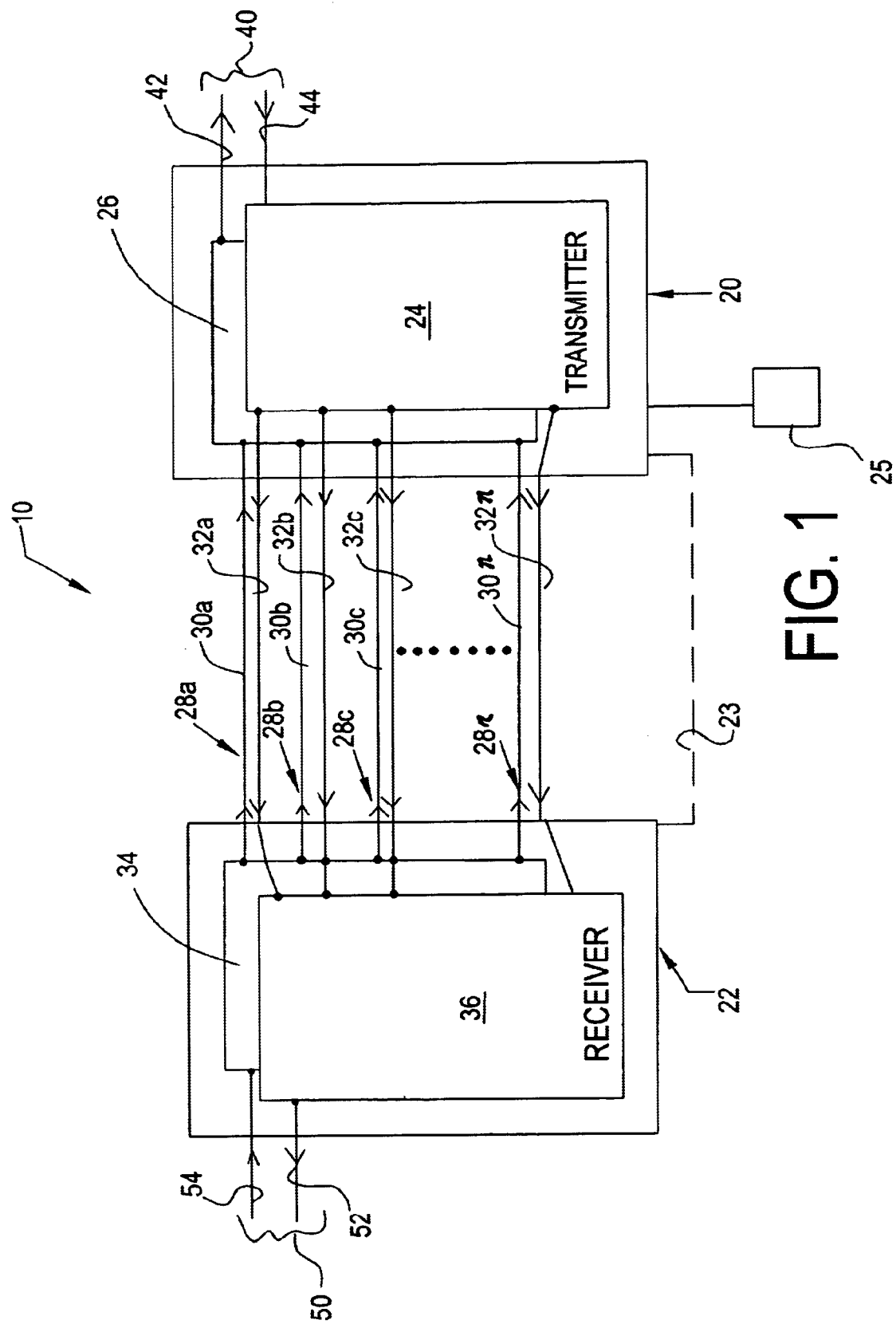
FIG. 1 is a block diagram of two inverse multiplexers (IMUXs) coupled by multiple bi-directional physical communication links for passing ATM cell streams over the links.

Referring now to FIG. 1, a system 10 includes at least two inverse multiplexers (IMUXs) 20 and 22 coupled by a pre-activation communication channel 23 and multiple physical communication links 28a–n. The system 10 is also shown with a processor 25 coupled to the IMUX 20, however, the processor 25 could be coupled to the IMUX 22 or the processor 25 could be an internal part of either the IMUX 20 or 22.

For illustration purposes, the IMUXs 20 and 22 are shown coupled by the physical communication links 28a–n that re T1 or DS1 links, which carry bi-directional format data streams. Each link 28 carries data streams in either direction at a specified rate, which depends on the links characteristics. In the illustrative example, each of the links 28a–n carries one DSI data stream 30a–n in one direction and another DSI data tream 32a–n in the other direction. In discussing the capacity of each ink to carry information, the term's data rate, bit rate, and bandwidth are used interchangeably to indicate capacity to carry information. In other embodiments, data streams of different rates and formats, such s a DSL on E1, may be utilized. The channel 23 is used for communication between the IMUX 20 and the IMUX 22 information related to the optimal rate prior to training of the links 28.

Each of the links 28a–n can be a part of or pass through a public switched telephone network (PSTN). Furthermore, the links 28a–n may be physically separate, for instance, using separate conductors in separate cables, or using different paths through the PSTN. Also, links 28a–n may be physically combined for all or part of the path between IMUX 20 and 22. For example, the data streams may be multiplexed onto a higher capacity physical communication link, such as a DS3 link. Additionally, links 28a–n may exhibit different properties, including different transmission delays and different error rates.

The logical structure for the IMUX 20 and 22 can be implemented using a programmable processor, dedicated hardware, or both. A controller may, in some embodiments, be implemented as software processes executing on a programmable processor, under the control of software stored on a medium, such as a semiconductor read-only-memory (ROM). The controller may also include timing or clocking circuitry to determine the timing of data transfers between modules or units. If the IMUX 20 and/or 22 includes a programmable processor, then software can be distributed to the IMUX 20 and/or 22 on a physical removable medium or over a data network.

The IMUX 20 includes a transmitter 24 and a receiver 26. For illustrative purposes, an ATM cell stream is discussed, but any form or format of data stream can be handled. The transmitter 24 accepts an inbound ATM cell stream 44 over a physical ATM communication link 40. The transmitter 24 of the IMUX 20 inverse multiplexes and sends the ATM cell stream 44 in the form of the DS1 data streams 32a–n over the links 28a–n, respectively, to the IMUX 22.

The IMUX 22 includes a transmitter 34 and the receiver 36. The receiver 36 receives the DS1 data streams 32a–n from the transmitter 24 of the IMUX 20 and multiplexes the DS1 data streams 32a–n. The IMUX 22 can also receive incoming ATM cell streams and inverse multiplex the incoming ATM cell stream over the links 28a–n. More specifically, the transmitter 34 of the IMUX 22 accepts an inbound ATM cell stream 54 over a physical ATM communication link 50. The transmitter 34 inverse multiplexes the ATM cell stream 54 in the form of DS1 data streams 30a–n over a selected number of the links 28a–n, respectively, that are then received by the receiver 26 of the IMUX 20; the receiver 26 multiplexes the DS1 data streams 30a–n to form an outbound ATM cell stream 42 transmitted over the ATM communication link 40.

The IMUXs 20 and 22 can be configured to use any number of the links 28a–n. Each of the DS1 data streams 30a–n on the links 28a–n, respectively, each terminate at the receiver 26 of the IMUX 20 where ATM cell stream is reconstructed to produce an ATM cell stream 42 and sent over the ATM communication link 40. Likewise, the DS1 data streams 32a–n on the links 28a–n, respectively, each terminate at the receiver 36 of the IMUX 22, where an ATM cell stream 52 is reconstructed and sent over the ATM communication link 50.

In order for the ATM cell stream to be reconstructed, the ATM cells that are received at the receivers 26 and 36 from the links 28a–n must be multiplexed by the receivers 26 and 36 in the same order that the ATM cells were received at the transmitters 20 and 22 from the ATM communication links 40 and 50, respectively. Accordingly, a number of links from the links 28a–n must be selected, synchronized, and trained to operate at an optimal rate. Typically, the number of links that are selected from the links 28a–n depends on the data rate that the customer requests, the physical characteristics of each of the links 28a–n, and the number of available links. Based on these factors and other criteria, the optimal rate for each group of selected links 28 is selected.

The process of determining and selecting the optimal transmission rate is carded out by the processor 25. Various factors are considered, including the characteristics of each link 28, in order to determine the optimal rate. The characteristics considered include attenuation, error-rate, and noise. For example, if four links between the IMUX 20 and 22 are selected, such as links 28a–d, to carry the inverse multiplexed ATM cell stream, then four links are trained at the selected optimal rate.

Figure 2:
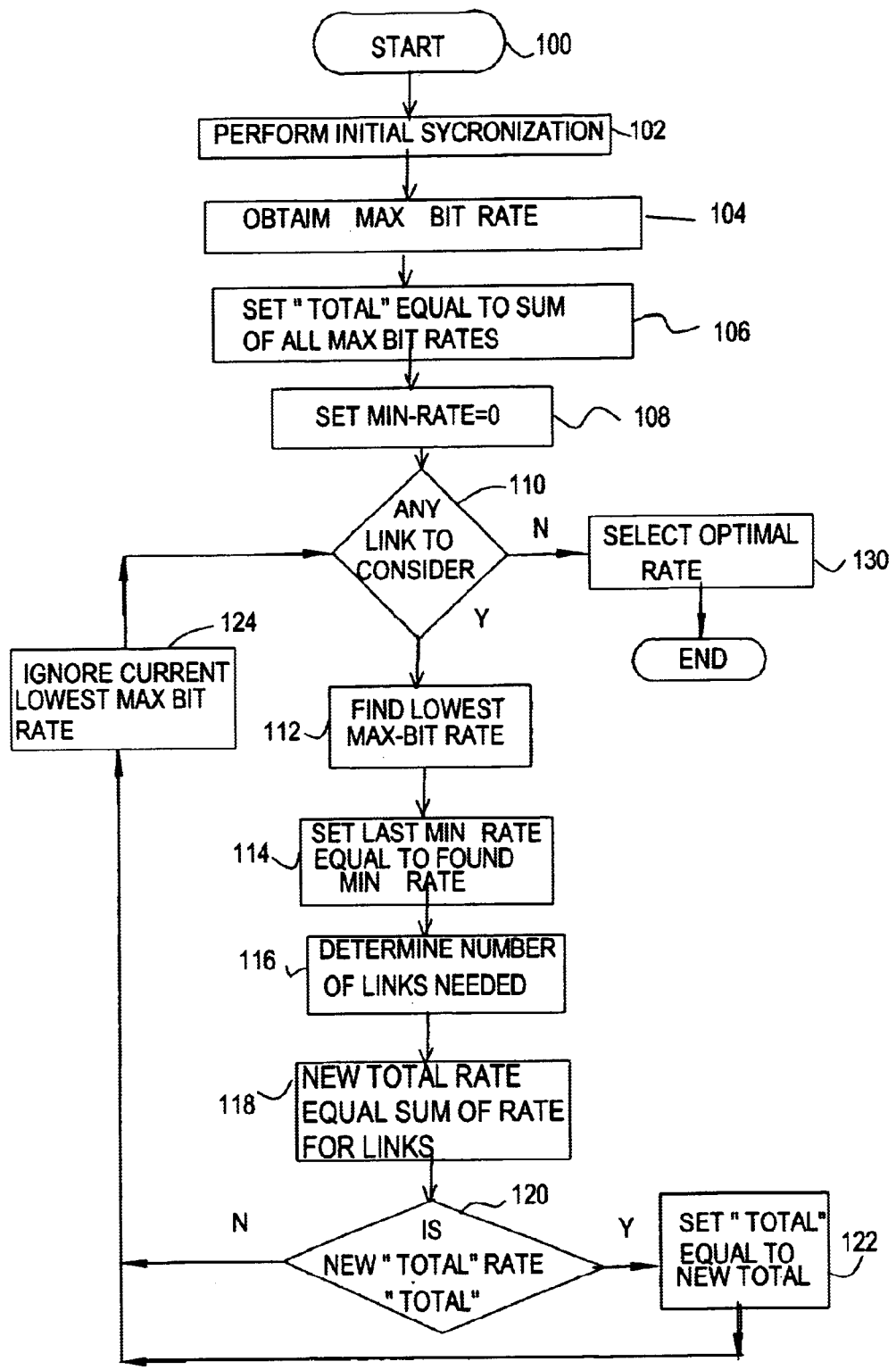
FIG. 2 is a flow chart for determining the optimal rate and the number of links involved in transporting data between the IMUXs of FIG. 1.

Referring now to FIG. 2, the process of determining the optimal rate begins at step 100. At step 102, the characteristics of each link 28a–n is determined and initial synchronization is performed. A predefined signal is transmitted from one IMUX, typically the master IMUX, to the other IMUX on each of the links 28. Based on the received signal characteristics, the characteristics of each link 28 can be determined using such factors as attenuation. At step 104, using the characteristics of each link 28, a maximum-bit-rate or bandwidth is determined for each link 28

At step 106, the total bandwidth for all the links 28a–n are determined by adding or summing the maximum-bit-rate for each of the links 28. Additionally, the total available bandwidth is determined by setting each link 28 to operate at the lowest maximum-bit-rate selected from all of the available links and then calculating the total capacity, which is based on the selected lowest maximum-bit-rate times the number of available links 28. At step 108, a minimum-bit-rate variable is defined and set to zero. At step 110, it is determined if all links have been compared and analyzed in order to determine the optimal data rate. Typically, there will be several links to compare, unless all of links 28 coupling the IMUX 20 and the IMUX 22 are not successfully activated, and hence, unavailable.

If there are available links 28 that can be compared and analyzed, then at step 112, the maximum-bit-rates for all of the successfully activated links 28 are compared to find the link 28 with the lowest maximum-bit-rate or bandwidth. At step 114, the link 28 with the lowest value of maximumbit-rate is found and the minimum-bit-rate is set to equal the maximum-bit-rate of that link 28. At step 116, using the now defined minimum-bit-rate, the systems determined how many of the available links 28 are needed to provide at least the desired bandwidth with each link 28 trained at the minimum-bit-rate. At step 118, the total-optimal-bandwidth is determined, which is the sum of all of the links 28 needed to operate at the defined minimum-bit-rate.

At step 120, it is determined if the total-optimal-bandwidth is greater than the available total bandwidth that was previously determined. If so, then at step 122, the total available bandwidth is set equal to the total-optimal-bandwidth. At step 124, the link 28 that was determined to have the lowest maximum-bit-rate is ignored so that the link with the next lowest maximum-bit-rate can be found and the process returns to step 110. If at step 120 it is determined that the total-optimal-bandwidth is not greater than the previous value of available total bandwidth, then no change is made and the process returns to step 124.

If at step 110 it is determined that there are no other links to consider, meaning that all of the links 28 have been considered or there are no available links 28, then at step 130, the optimal rate is determined by taking the total available bandwidth and dividing it by the number of links 28 that are to participate at the optimal data rate.

In some instances, the number of links 28 selected to participate in transporting the data stream between the IMUX may be greater than needed. Thus, there may be at east one link available to be trained at the optimal data rate and set to idle status as describe in detail in available U. S. application Ser. No. 09/751,808 titled "PORT SWAPPING FOR INVERSE MULTIPLEXED DIGITAL SUBSCRIBER LINES" filed on Dec. 29, 2000 and incorporated herein by reference.

It is to be understood that the foregoing description is intended to illustrate and not limit the scope of the invention, which is defined by the scope of the appended claims. Other aspects, advantages, and modifications are within the scope of the following claims. Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes in form and shape may be made therein without departing from the scope and spirit of the invention as set forth above and claimed hereafter.

What is claimed is:

1. A system for determining an optimal transmission rate for passing a cell stream from a first location to a second location at a desired transmission rate, the system comprising:
    a first unit at the first location coupled to one end of each of a plurality of low capacity data links for assisting in determining characteristics of each of the links using a test signal transmitted over each of the links;
    a second unit at the second location coupled to the other end of each of the links for assisting in determining the characteristics of each of the links based on the characteristic of the test signal received at the second unit; and
    a processor coupled to the second unit for determining the optimal transmission rate based on the characteristics of the links and the number of links needed to provide the desired transmission rate by:
        determining a maximum transmission rate for each of the links to create a list of available links and associated maximum transmission rates;
        selecting the link with the lowest rate and setting all available links to transmit at the same rate to determine a total available rate;
        finding the next lowest rate from the available rates and setting all other links to transmit at the next lowest rate to determine another total available rate;
        repeating the finding step to create a list of maximum transmission rates and corresponding total available rates; and
        choosing a rate from the maximum transmission rates that corresponds to one of the available links, and thus, one total available rate from the total available rates that is at least equal to or greater than the desired transmission rate to produce the optimal transmission rate.

2. The system of claim 1, wherein the characteristics of each of the links includes the maximum transmission rate for each of the links.

3. The system of claim 1, wherein a total available transmission rate is at least equal to the desired transmission rate.

4. The system of claim 3, wherein the total available transmission rate is the sum of the transmission rate of each of the links.

5. The system of claim 1, wherein the first unit receives a data stream and inverse multiplexes the data stream over at least two trained links selected from the links.

6. The system of claim 5, wherein the second unit receives and multiplexes the inverse multiplexed data stream from each of links to produce the data stream.

7. The system of claim 6, further comprising at least one data link selected from the links that is trained and set to idle status, wherein the first unit and the second to switch to use the idle link to replace any one of the links that has failed and wherein the status of the idle link is changed to active.

8. The system of claim 7, wherein the failed link is trained at the optimal transmission rate and set to idle status.

9. A system for determining an optimal transmission rate for passing a cell stream from a first location to a second location at a desired transmission rate, the system comprising:
    a first unit at the first location coupled to one end of each of a plurality of low capacity data links for assisting in determining characteristics of each of the links using a test signal transmitted over each of the links;
    a second unit at the second location coupled to the other end of each of the links for assisting in determining the characteristics of each of the links based on the characteristic of the test signal received at the second unit; and
    a processor coupled to the second unit for determining the optimal transmission rate based on the characteristics of the links and the number of links needed to provide the desired transmission rate;
    wherein the first unit receives an ATM cell stream an inverse multiplexes the cell stream over the links that are trained at the optimal rate and wherein the second unit receives and multiplexes the inverse multiplexed cell stream from each of the active trained data links to produce the cell stream and wherein at least one link is trained and set to idle status.

10. The system of claim 9, wherein the first unit and the second unit switch to use the idle link to replace a failed link and wherein the status of the idle data link is change to active.

11. The system of claim 10, wherein the failed link is retrained at the optimal rate and is set to idle status.

12. A method for determining an optimal rate for transmitting a cell stream at a desired transmission rate from a first location to a second location over a plurality of low capacity links, the method comprising:

determining characteristics and a maximum rate for each of the links to create a list of available links and associated transmission rates;

selecting the link with the lowest rate and setting all available links to transmit at the same rate to determine a total available rate;

comparing the total rate based on the lowest rate and the number of available links to the desired rate;

finding the next lowest rate from the available rates and setting all other links to transmit at the next lowest rate to determine another total available rate;

repeating the finding step until all available rates have been considered to create a list of maximum rates and corresponding total available rates; and choosing a rate from the maximum rates that corresponds to one of the available links, and thus, one total available rate from the total available rates that is at least equal to or greater than the desired rate to produce the optimal rate.

13. The system of claim 9, wherein the characteristics of each of the links includes the maximum transmission rate for each of the links.

14. The system of claim 9, wherein a total available transmission rate is at least equal to the desired transmission rate.

15. The system of claim 14, wherein the total available transmission rate is the sum of the transmission rate of each of the links.

16. The method of claim 12, further comprising training a least one of the available links to be an idle link and setting status of the idle link to idle.

17. The method of claim 16, further comprising replacing failed link with the replacement link, wherein the status of the idle link is changed to active.

18. The method of claim 17, further comprising retraining the failed link at the optimal rate and setting the status of the failed link to active.

* * * * *

UNITED STATES PATENT AND TRADEMARK OFFICE
CERTIFICATE OF CORRECTION

PATENT NO.      : 6,963,533 B2
APPLICATION NO. : 09/751581
DATED           : November 8, 2005
INVENTOR(S)     : Brana Kukic It is certified that error appears in the above-identified patent and that said Letters Patent is hereby corrected as shown below:

In the Drawing Figures:

Drawing Sheet 2 of 2 (Fig. 2), Block 102, After "INITIAL" delete "SYCRONIZATION" and insert -- SYNCHRONIZATION --.

Drawing Sheet 2 of 2 (Fig. 2), Block 104, Delete "OBTAIM" and insert -- OBTAIN --.

Drawing Sheet 2 of 2 (Fig. 2), Block 110,

Delete " 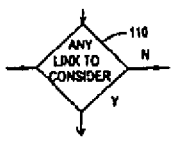 " and insert -- 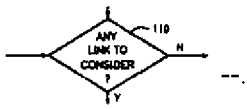 --.

Drawing Sheet 2 of 2 (Fig. 2), Block 114, Line 1, After "LAST" delete "MIN RATE" and insert -- MIN-RATE --.

Drawing Sheet 2 of 2 (Fig. 2), Block 114, Line 3, Below "FOUND" delete "MIN RATE" and insert -- MAX RATE --.

Drawing Sheet 2 of 2 (Fig. 2), Block 118, Line 2, After "OF" delete "RATE" and insert -- RATES --.

Signed and Sealed this

Seventeenth Day of August, 2010

David J. Kappos
*Director of the United States Patent and Trademark Office*

Drawing Sheet 2 of 2 (Fig. 2), Block 120, Line 2, After "RATE" insert -- > --.

Drawing Sheet 2 of 2 (Fig. 2), Block 120, Line 4, Below "TOTAL" insert -- ? --.

Drawing Sheet 2 of 2 (FIG. 2), Block 120, Line 3, Delete "NEW TOTAL" and insert -- "NEW TOTAL" --.

In the Specification:

Column 1, Line 19 (Approx.), After "stream" insert -- . --.

Column 3, Line 12 (Approx.), Delete "re" and insert -- are --.

Column 3, Line 17 (Approx.), Delete "DSI" and insert -- DS1 --.

Column 3, Line 18 (Approx.), Delete "DSI" and insert -- DS1 --.

Column 3, Line 18 (Approx.), Delete "tream" and insert -- stream --.

Column 3, Line 23 (Approx.), Delete "such" delete "s" and insert -- as --.

Column 4, Line 31 (Approx.), Delete "carded" and insert -- carried --.

Column 4, Line 48, After "28" insert -- . --.

Column 5, Line 29 (Approx.), Delete "east" and insert -- least --.

Column 5, Line 30 (Approx.), Delete "describe" and insert -- described --.

Column 6, Line 32, In Claim 6, after "of" insert -- the --.

Column 6, Line 35, In Claim 7, after "second" delete "to" and insert -- unit --.

Column 6, Line 57, In Claim 9, delete "an" and insert -- and --.

Column 6, Line 63, In Claim 9, after "trained" insert -- at the optimal rate --.

Column 6, Line 66, In Claim 10, delete "change" and insert -- changed --.

Column 8, Line 14, In Claim 16, delete "a" and insert -- at --.

Column 8, Line 17, In Claim 17, before "failed" insert -- a --.